Figure 1:
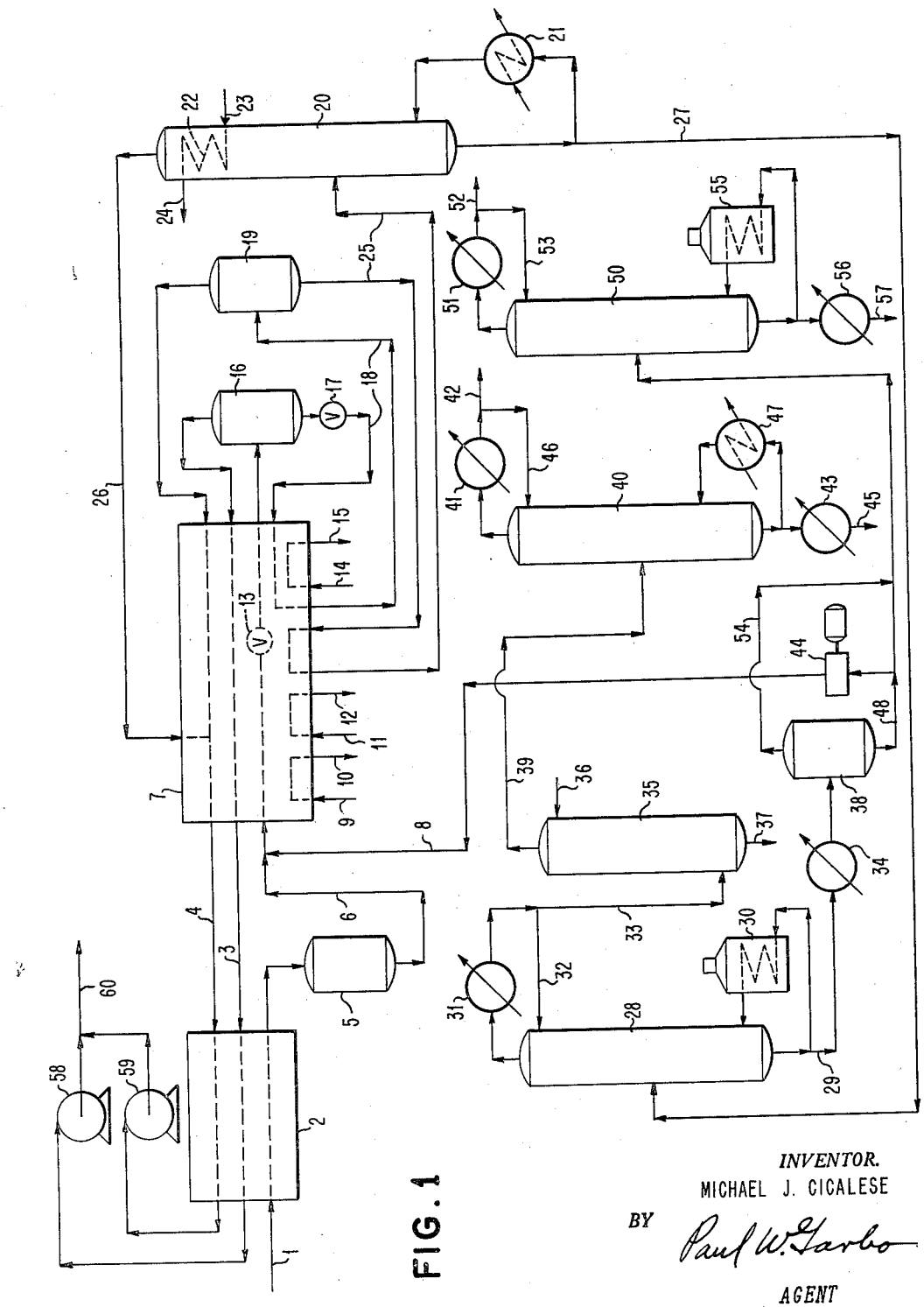

March 7, 1961 M. J. CICALESE 2,973,834
HYDROCARBON RECOVERY FROM NATURAL GAS
Filed Aug. 12, 1958 2 Sheets-Sheet 1

INVENTOR.
MICHAEL J. CICALESE
BY Paul W. Garbo
AGENT

March 7, 1961 M. J. CICALESE 2,973,834
HYDROCARBON RECOVERY FROM NATURAL GAS
Filed Aug. 12, 1958 2 Sheets-Sheet 2

INVENTOR.
MICHAEL J. CICALESE
BY *Paul W. Garbo*
AGENT

United States Patent Office 2,973,834
Patented Mar. 7, 1961

2,973,834

HYDROCARBON RECOVERY FROM NATURAL GAS

Michael J. Cicalese, West Hempstead, N.Y., assignor to Hydrocarbon Research, Inc., New York, N.Y., a corporation of New Jersey Filed Aug. 12, 1958, Ser. No. 754,626

12 Claims. (Cl. 183—120)

This invention relates to an improved process for the separation of hydrocarbons heavier than methane from natural gas.

Natural gas, after the separation of entrained liquid, is composed mainly of methane. However, it usually also contains substantial proportions of heavier compounds, e.g., ethane, propane, butane and hydrocarbons boiling in the gasoline range. Hydrocarbons of higher molecular weight than methane have various uses which make it uneconomical to burn them with the methane as ordinary fuel gas. For example, propane is widely used as a solvent in the precipitation of high molecular weight hydrocarbons, e.g., waxes and asphaltenes, from hydrocarbon oils. Butane is commonly dehydrogenated to butylene and butadiene which are used in the production of synthetic rubbers and resins. Gasoline, of course, is much more profitably used as a fuel in internal combustion engines than in furnaces and burners.

It has been proposed to separate the heavier hydrocarbons from natural gas by condensing such hydrocarbons at high pressure and low temperature and distilling the condensate. In this type of process, a substantial proportion of methane is condensed with the heavier hydrocarbons. In order to recover the methane and prevent it from complicating the subsequent distillation of the heavier hydrocarbons, the initial condensate is usually flashed to a lower pressure and phase separated, with the gasiform phase being sent to the pipeline for the treated natural gas and the remaining liquid being fractionated by distillation. A disadvantage connected with this procedure, especially when the natural gas is relatively lean, i.e., contains a small percentage of hydrocarbons heavier than methane, is that the gas in condensing tends to approach the properties of pure methane. Thus, at temperatures which can be economically obtained by means of commercial refrigeration techniques, pressures close to the critical pressure of methane, which is fairly low, i.e., 675 p.s.i.a., must be used to effect condensation of the gas. Under these conditions, the composition of the condensate is not greatly different from that of the vapor and the condensation of a substantial proportion of hydrocarbons heavier than methane requires also the condensation of a large quantity of methane. The condensation of a substantial quantity of methane has the disadvantages of a large waste of refrigeration during subsequent vaporization of the condensed methane, increased cost of recompressing to pipeline pressure the vapor obtained by vaporization at a pressure necessarily well below the critical pressure of methane, and the appreciable loss of hydrocarbons heavier than methane which are flashed off with the methane when the latter is vaporized at pressures below the critical pressure of methane. It may be seen, therefore, that any modification of the process which results in a high degree of separation of hydrocarbons heavier than methane with lower costs of refrigeration and recompression of the product gas is very desirable.

It is an object of this invention to provide an improved process of separating hydrocarbons heavier than methane from natural gas whereby a high degree of separation is achieved. It is a further object to provide such a process wherein refrigeration and recompression costs are reduced.

In accordance with the invention, a small quantity of a hydrocarbon fraction with an average molecular weight greater than that of butane is added to natural gas containing hydrocarbons heavier than methane prior to the separation of such original components. The added hydrocarbon fraction apparently acts to increase the effective critical pressure of the original gas. Under these circumstances, most of the hydrocarbons heavier than methane may be condensed from the gas at fairly high pressures without going to excessively low temperatures or condensing too large a proportion of methane. The subsequent flashing of the condensed mixture to vaporize predominantly the methane which has condensed may, therefore, be done under conditions such that a much smaller proportion of the hydrocarbons heavier than methane in the original gas is flashed off with the methane and not recovered than if the addition of the hydrocarbon fraction to the natural gas were not made. Thus, it may be seen that the simple expedient of adding to natural gas hydrocarbons having five or more carbon atoms in the molecule results in a minimization of the disadvantages previously set out for the type of process involved in separating hydrocarbons heavier than methane from natural gas.

The high pressure at which methane may be flashed off from the condensate without also flashing off too much of the hydrocarbons heavier than methane pursuant to this invention is usually very advantageous since the pipeline pressure of natural gas is in most cases higher than such flashing pressure. For this reason, the relatively high pressure at which the methane is flashed under this invention results in decreased recompression of the treated gas to pipeline pressure and, of course, a lower recompression cost, as well as a greater recovery of the hydrocarbons heavier than methane. If, however, the natural gas is supplied to the process at a pressure lower than that at which an optimum degree of hydrocarbon condensation can be achieved, it may be compressed to obtain an efficient separation.

Basically, any hydrocarbon fraction having an average molecular weight greater than that of butane may be used to obtain the benefit of this invention. However, the fact that the heavier the hydrocarbon is, the more difficult it is to flow the condensate under the low temperatures encountered, generally indicates the desirability of a practical upper limit to the molecular weight of the hydrocarbons which may be used. In most cases, at least a major proportion of the hydrocarbons used will have a boiling point not higher than the kerosene range, i.e., 500° F. A hydrocarbon fraction most of which boils within the gasoline range, i.e., 100 to 400° F., is preferred. Logically, a very convenient source of the hydrocarbon fraction is the gasoline recovered by the process of this invention from the natural gas itself. The quantity of hydrocarbon fraction mixed with the natural gas before separation may vary depending on such factors as the pressure of the natural gas, its content of hydrocarbons and the degree of separation desired. It has been found, surprisingly, that in most cases a very small amount of hydrocarbons having at least five carbon atoms per molecule and preferably at least seven carbon atoms is effective in greatly improving the separation of hydrocarbons heavier than methane from the gas. Usually, an addition in the range of 0.5 to 5 mol percent of the gas is sufficient.

While the process of this invention is feasible with any type of natural gas, it is particularly useful with relatively lean gases, i.e., those containing less than 10 mol percent of hydrocarbons heavier than methane. With such lean gases, the separation of the hydrocarbons heavier than methane, which is ordinarily very difficult due to the small selectivity in the condensation of methane and the heavier hydrocarbons, becomes much easier as a result of this invention.

A process according to this invention will now be described in greater detail with reference to Figure 1 of the drawings which is a schematic flowsheet of the process. All temperatures are in degrees Fahrenheit.

Natural gas at a pipeline pressure of 1000 p.s.i.g. and at a temperature of 100° enters the system by line 1, flows through heat exchanger 2 wherein it is cooled to about 65° by returning product gas in line 3, and is dried in drier 5 which is packed with a suitable desiccant such as alumina. The dried gas leaves drier 5 by line 6 and is combined with a substantially paraffinic hydrocarbon stream from line 8 obtained as hereinafter described and composed mainly of hydrocarbons boiling in the gasoline range. The combined stream then passes to low-temperature heat exchange zone 7 wherein it is again cooled by returning product gas which is at a lower temperature level than that entering heat exchanger 2 and also by various external refrigerants which are circulated through various parts of heat exchange zone 7. For example, boiling propane at 15° may be used near the warm end of zone 7 and circulated through lines 9 and 10, liquid propane sub-cooled to −40° at an intermediate point of zone 7 and circulated through lines 11 and 12, and boiling ethane at −105° near the cold end of zone 7 and circulated through lines 14 and 15. To provide additional refrigeration near the cold end of zone 7 and to aid in the flashing off of methane from the condensate formed by chilling the natural gas in zone 7, the pressure of the incoming gas is reduced to 650 p.s.i.g. by means of a Joule-Thompson expansion through reducing valve 13 within the colder portion of zone 7 which results in substantial cooling and condensation of the gas. The gas in line 3 leaves heat exchange zone 2 at 85° and is compressed by compressor 58 to a pipeline pressure of 950 p.s.i.g. Heat exchange zone 7 may comprise a battery of several heat exchangers in various positions and with various streams in heat exchange relationship with each other. The specific arrangement of such exchangers will depend on such engineering considerations as minimizing capital costs or operating costs.

The partially condensed gas from zone 7 is passed to flash separator 16 wherein it is separated at −95° and 650 p.s.i.g. into a gas comprising methane free of most of the heavier hydrocarbons originally present in the natural gas. The thus separated gas is returned through line 3 to heat exchangers 7 and 2 wherein it is used to cool incoming gas. The condensate containing most of the hydrocarbons heavier than methane originally present in the natural gas and some methane is drawn from separator 16 by line 18.

The pressure of the liquid from separator 16 is reduced through valve 17 resulting in a further cooling due to Joule-Thompson expansion and the resulting vapor-liquid mixture is passed by line 18 through the cold end of heat exchange zone 7 wherein it serves to cool incoming air. It is then separated at −95° and 500 p.s.i.g. in flash separator 19 yielding a gas stream, again composed mostly of methane, which is sent by line 4 through heat exchange zones 7 and 2, and a liquid containing most of the hydrocarbons heavier than methane in the original gas and still containing some methane. The condensate in separator 19 is passed by line 25 through the colder portion of zone 7 and into de-ethanizing column 20. The gas in line 4 leaves heat exchange zone 2 at 85°, is compressed by compressor 59 to the pipeline pressure of 950 p.s.i.g. and is combined with the gas from line 3 on the high-pressure side of compressor 58. The combined stream constitutes the product gas which leaves the system by line 60.

The liquid from separator 19 is fractionated in de-ethanizer 20 into an overhead product consisting almost entirely of methane and ethane and a bottoms product containing propane and heavier hydrocarbons. Heat for column 20 is provided by steam in reboiler 21 and reflux by boiling ethane at −65° in condenser 22 at the top, the ethane entering condenser 22 by line 23 and leaving by line 24. The overhead gas at −49° and 460 p.s.i.g. leaves condenser 22 by line 26 and is combined with outgoing gas in line 4 within heat exchange zone 7. In this particular embodiment, ethane is not separated for further use but is left in the product gas. However, it is within the scope of this invention to further separate ethane from the methane-ethane mixture.

The de-ethanizer bottoms product at 343° and 476 p.s.i.g. is transferred by line 27 to an intermediate point in de-butanizing column 28 wherein it is separated into an overhead product containing mostly propane and butane and a bottoms product composed mainly of hydrocarbons heavier than butane, the latter product being withdrawn at 356° and 105 p.s.i.g. by line 29. Heat is supplied to de-butanizing column 28 by pumping a portion of the bottoms product through directly fired heater 30. The overhead product is condensed in water-cooled condenser 31 with part of the condensate returning by line 32 to column 28 as reflux. Most of the condensate at 90° and 95 p.s.i.g. is passed by line 33 to caustic wash tower 35 wherein most of the sulfur-containing impurities in the condensate are removed by caustic soda solution which enters tower 35 by line 36 and leaves by line 37. The washed propane-butane solution is transferred by line 39 to de-propanizing column 40 wherein it is separated into a propane product condensed in water-cooled condenser 41 and drawn off by line 42 and a butane product cooled in water-cooler 43 and drawn off by line 45. Part of the condensed propane is returned to column 40 as reflux by line 46 and heat is supplied by circulating some of the butane bottoms product through steam-heated reboiler 47.

The bottoms product from de-butanizing column 28 is passed by line 29 through water-cooler 34 into flash separator 38 where the lightest components are flashed off from the main body of liquid which is withdrawn by line 48. Part of this liquid is introduced by line 8 and pump 44 into the dried natural gas in line 6 as hereinbefore mentioned. The stream in line 8 constitutes the added paraffinic material used under this invention. The more volatile components like propane and butane are separated from the debutanizer bottoms product in separator 38, since if they are left in the stream that is combined with the gas in line 6, they tend to be flashed off with the gasiform streams leaving separators 16 and 19 and column 20 with the result that they are not fully recovered with the more valuable hydrocarbon products.

The vapor from separator 38 is withdrawn by line 54, combined with the remainder of the liquid in line 48 and the mixture is transferred to distillation column 50 wherein it is fractionated into a top product made up almost entirely of hydrocarbons boiling in the gasoline range and a bottoms product composed of hydrocarbons boiling above the gasoline range. The top product is condensed in water-cooled condenser 51 and withdrawn by line 52 while part of the condensate is returned to column 50 as reflux by line 53. Heat is supplied to column 50 by circulating a portion of the bottoms product through directly fired heater 55. The remainder of the bottoms product is cooled in water-cooler 56 and withdrawn from the system by line 57.

The various distillation columns each contain means such as bubble caps and trays designed for intimate vapor-liquid contact and thus for efficient fractionation of the feed stream into the particular products desired. Instead of using a plurality of distillation columns to separate the recovered hydrocarbons, it is possible to carry out most or all of the desired separation in a single column.

Figure 2:
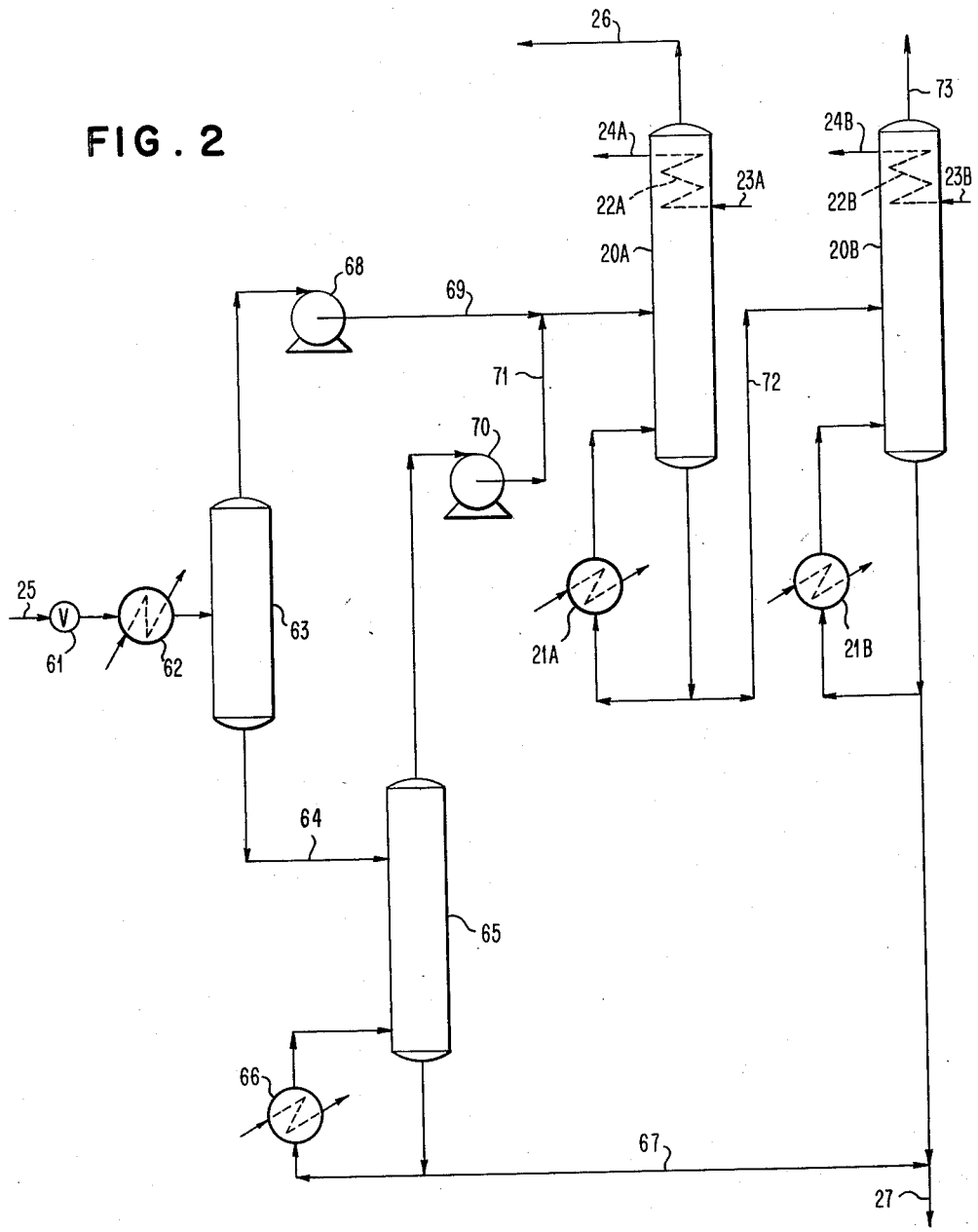

Figure 2 is a schematic flowsheet showing a modification of Figure 1 for the purpose of separately recovering ethane from the natural gas treated by the process of Figure 1. An ethane fraction so recovered is valuable as a feed material to a cracking plant producing ethylene.

The modification of Figure 2 merely replaces de-ethanizing column 20 of Figure 1. In this instance, the stream flowing from heat exchanger 7 through line 25 is expanded by passage through valve 61. The reduction in pressure, say of the order of 250 p.s.i.g., effects vaporization of the bulk of the methane and ethane present in the liquid stream prior to expansion. The expanded stream passes through heat exchanger 62, where it releases some of its refrigeration to any stream in the process requiring refrigeration, and then discharges into separator 63. The liquid phase flows through line 64 into stripping column 65 where the small residual amount of methane and ethane in the liquid phase is vaporized by circulating liquid in the bottom of column 65 through steam heater 66. The liquid hydrocarbons thus stripped of methane and ethane discharge from column 65 through line 67 into line 27 of Figure 1.

The vapor phase rich in methane and ethane passes from separator 63 to compressor 68 which brings the pressure of this stream to approximately the pressure in line 25 before expansion in valve 61 and even slightly higher, say by 50 p.s.i.g., to overcome the pressure drops of columns 20A and 20B. The recompressed vapor discharges through line 69 into demethanizing column 20A. Simultaneously, methane and ethane vapors leaving column 65 are recompressed in compressor 70 and added by line 71 to the vapors in line 69. Column 20A is operated like column 20 of Figure 1 but the heating by heat exchanger 21A and the cooling by condenser 22A are regulated to yield an overhead vapor stream rich in methane which flows into line 26 of Figure 1 and a bottom liquid stream rich in ethane which is tranferred by line 72 to de-ethanizing column 20B. In this instance, heat exchanger 21B and condenser 22B are operated to effect fractionation of the stream introduced into column 20B by line 72. An ethane-rich fraction is withdrawn by line 73 for utilization elsewhere. Liquid hydrocarbons containing little or no methane and ethane discharge from column 20B into line 27 of Figure 1.

At some sacrifice in ethane recovery, elements 61 to 71, inclusive, of Figure 2 may be omitted. In such case, line 25 discharges directly into column 20A. This alternative process arrangement for the recovery of ethane requires less equipment but is less efficient than the arrangement shown in Figure 2.

The invention will now be further clarified by a typical example.

Natural gas having an average molecular weight of 17.5 is treated to remove a substantial portion of the hydrocarbons heavier than methane according to the previously described process. The composition of the gas is shown in Table 1.

Table 1

| Component | Mol Percent | Weight Percent |
| --- | --- | --- |
| Methane | 93.4 | 85.4 |
| Ethane | 4.2 | 7.2 |
| Propane | 1.3 | 3.3 |
| Butanes | 0.80 | 2.7 |
| Heavier hydrocarbons boiling to 400° F | 0.29 | 1.4 |
| Heavier hydrocarbons boiling over 400° F | 0.006 | 0.075 |

To accomplish an efficient removal of the hydrocarbons heavier than methane from the gas while at the same time obtaining the product gas from the system at a fairly high pressure, the debutanizer bottom product from separator 38, which contains a major proportion of hydrocarbons boiling in the gasoline range, is combined with the gas before it is sent into low-temperature heat exchange zone 7. Various streams entering, leaving and circulating within the system are shown in Table 2.

Table 2

| Stream | Mols per hour | Pounds per hour |
| --- | --- | --- |
| Natural Gas | 15,337 | 268,213 |
| Gas from separator 16 | 10,521 | 172,324 |
| Gas from separator 19 | 3,008 | 49,625 |
| Gas from column 20 | 1,484 | 28,727 |
| Total Product Gas | 15,013 | 250,676 |
| Propane product | 168.2 | 7,380 |
| Butane product | 112.8 | 6,567 |
| Circulated gasoline (from separator 38) | 187.5 | 22,294 |
| Gasoline product | 42.9 | 3,388 |
| Heavy oil product | 1.0 | 202 |

It can be seen from Table 2 that despite the fact that the natural gas is fairly lean with respect to hydrocarbons other than methane, the process of this invention recovers substantial amounts of valuable hydrocarbons heavier than methane. The total product gas leaving the system has the composition shown in Table 3.

Table 3

| Component | Mol Percent | Weight Percent |
| --- | --- | --- |
| Methane | 95.4 | 91.4 |
| Ethane | 4.3 | 7.7 |
| Propane | 0.25 | 0.62 |
| Butanes | 0.059 | 0.20 |
| Pentanes | 0.018 | 0.078 |

Natural gas from some areas contains appreciable quantities of impurities like carbon dioxide and hydrogen sulfide which not only are objectionable to the ultimate consumer of the gas but also interfere with the operation of any low-temperature process for the recovery of heavy hydrocarbons from natural gas. Where it is desired to separate hydrocarbons heavier than methane from a natural gas containing such troublesome impurities, the gas is first treated to eliminate the impurities. For this purpose, the natural gas may be scrubbed with a reagent such as monoethanolamine, diethanolamine or potassium carbonate. The treated gas may then be processed in accordance with this invention to recover therefrom hydrocarbons heavier than methane.

The type of hydrocarbons having at least five and preferably at least seven carbon atoms per molecule which are added to the natural gas pursuant to the invention may include olefins, aromatic hydrocarbons and cycloparaffins as well as aliphatic hydrocarbons. However, as a practical matter, the nature of the hydrocarbons actually added to the gas will generally be dictated by the hydrocarbons originally present in gas since a portion of these original hydrocarbons is desirably circulated in the process as the hydrocarbon fraction added to the gas. It has been found that a usual addition of hydrocarbons in the range of about 0.5 to 5% on a molar basis will raise the critical pressure of the natural gas by at least 20 p.s.i.g. and frequently by 30 to 50 p.s.i.g. This increase in critical pressure permits the attainment of a high recovery of hydrocarbons from natural gas at a higher pressure than would otherwise be possible.

In view of the various modifications of the invention which will occur to those skilled in the art upon consideration of the foregoing disclosure without departing from the spirit or scope thereof, only such limitations should be imposed as are indicated by the appended claims.

What is claimed is:

1. A process for treating natural gas which is at an elevated pressure approximating the critical pressure of methane to separate hydrocarbons heavier than methane therefrom which comprises adding to said natural gas a minor amount of a hydrocarbon fraction having an average molecular weight greater than that of butane, said minor amount being in the range of about 0.5 to 5 mol percent of said natural gas, lowering the temperature of the resulting mixture to about −95° F. at said elevated pressure to obtain a condensate of a major portion of the hydrocarbons heavier than methane in said mixture together with some methane and thus yield a treated gas predominantly methane with a content of hydrocarbons heavier than methane lower than the original content of said natural gas, fractionating said condensate to provide said minor amount of a hydrocarbon fraction that is added to said natural gas, and recovering hydrocarbons heavier than methane from the fractionation of said condensate.

2. The process of claim 1 wherein said natural gas comprises at least 90 mol percent of methane.

3. The process of claim 1 wherein said hydrocarbon fraction added to said natural gas boils essentially in the gasoline range.

4. The process of claim 1 wherein said minor amount of a hydrocarbon fraction is selected to raise the critical pressure of said natural gas at least 20 pounds per square inch.

5. The process of claim 1 wherein said hydrocarbon fraction added to said natural gas consists essentially of hydrocarbons having at least seven carbon atoms per molecule and boiling not in excess of about 500° F.

6. In the process of removing hydrocarbons heavier than methane from natural gas at an elevated pressure approximating the critical pressure of methane solely by condensation of said hydrocarbons heavier than methane at a low temperature of about −95° F. and separation of the condensate from the uncondensed portion of said natural gas, the improvement which comprises adding a minor amount of a hydrocarbon fraction having an average molecular weight greater than that of butane to said natural gas prior to said condensation.

7. The process of claim 6 wherein said minor amount of a hydrocarbon fraction is obtained by fractionation of said condensate.

8. The process of claim 7 wherein said hydrocarbon fraction obtained by fractionation boils essentially in the gasoline range.

9. The process of claim 6 wherein said natural gas comprises at least 90 mol percent of methane.

10. The process of claim 9 wherein said hydrocarbon fraction added to said natural gas consists essentially of hydrocarbons having at least seven carbon atoms per molecule and boiling not in excess of about 500° F.

11. The process of claim 10 wherein said minor amount of a hydrocarbon fraction is selected to raise the critical pressure of said natural gas at least 20 pounds per square inch.

12. The process of claim 6 wherein said minor amount of a hydrocarbon fraction is in the range of about 0.5 to 5 mol percent of natural gas.

References Cited in the file of this patent

UNITED STATES PATENTS

| | | |
|---|---|---|
| 1,340,427 | Wehr | May 18, 1920 |
| 2,451,136 | Wenzke | Oct. 12, 1948 |
| 2,573,341 | Kniel | Oct. 30, 1951 |
| 2,596,785 | Nelly et al. | May 13, 1952 |